United States Patent [19]
Ure

[11] Patent Number: 6,139,439
[45] Date of Patent: Oct. 31, 2000

[54] MEANS FOR LINEARIZING AN OPEN AIR FLOW

[75] Inventor: Clive F. Ure, Zephyrhills, Fla.

[73] Assignee: Nicholas M. Kavouklis, Tampa, Fla.

[21] Appl. No.: 08/241,364

[22] Filed: May 11, 1994

[51] Int. Cl.$^7$ ..................................................... A63G 31/00
[52] U.S. Cl. ............................ 472/136; 472/50; 434/258
[58] Field of Search .................................. 472/49, 50, 68, 472/136, 137; 434/247, 258; 73/147

[56] References Cited

U.S. PATENT DOCUMENTS

| | | |
|---|---|---|
| 3,484,953 | 12/1969 | Norheim, Jr. . |
| 4,457,509 | 7/1984 | St-Germain . |
| 4,535,983 | 8/1985 | De La Concha-Cacheres . |
| 4,578,037 | 3/1986 | Macangus et al. . |
| 4,700,565 | 10/1987 | Albuschkat . |
| 4,743,007 | 5/1988 | De La Concha-Cacheres . |
| 5,209,702 | 5/1993 | Arenas . |

FOREIGN PATENT DOCUMENTS

| | | |
|---|---|---|
| 710990 | 2/1963 | United Kingdom . |
| 919990 | 2/1963 | United Kingdom . |
| 1510768 | 5/1978 | United Kingdom . |

*Primary Examiner*—Kien T. Nguyen
*Attorney, Agent, or Firm*—C. N. Nirmel

[57] ABSTRACT

A mechanism for linearizing an open, vertically directed, high-speed air flow, generated by a propeller rotating about a vertical axis, includes a vertical cylindrical element mounted above and coaxially with the rotating propeller and a plurality of radially oriented vertically planar guide vanes supported at their radially outside ends in such a manner that ambient air can flow radially inward below and above the propeller. For large cross-section air-flows and improved elimination of swirl components from the flow, a second set of shorter radial guide vanes is provided in alternation with the vanes that are connected to the cylindrical element. A net structure is disposed above the guide vane structure for use of the invention in a system for producing a relatively large cross-section linearized flow to enable free-fall simulation exercises by one or more participants, to enable trainers to stand close to the free-falling participants. The preferred form of the net includes two orthogonally interwoven sets of cables each of which is individually tensioned at opposite ends and is entirely free of extraneous constraints, e.g., knots or swages, at cable intersections. This net structure, because of its freedom from extraneous flow impedances at cable intersections allows free passage of the upward air flow and serves to further improve the linearization thereof.

20 Claims, 3 Drawing Sheets

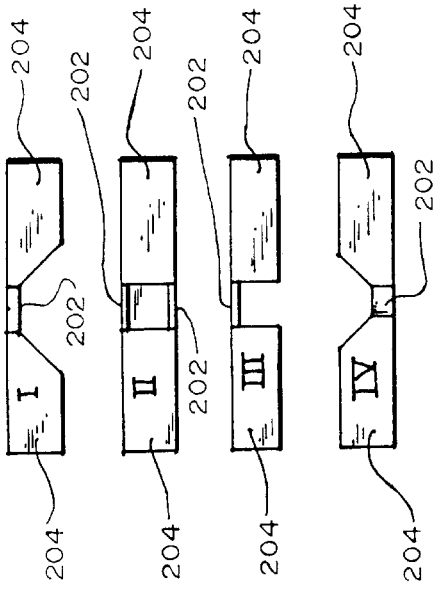
FIG. 6
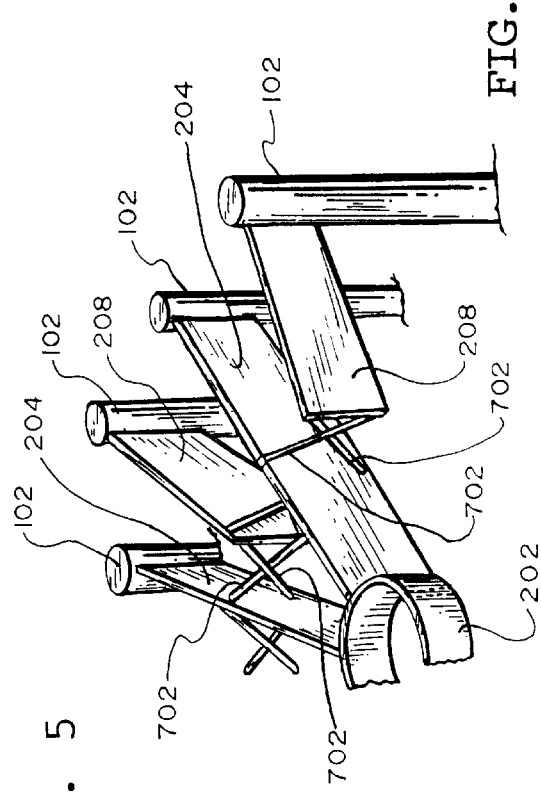
FIG. 7
FIG. 5

MEANS FOR LINEARIZING AN OPEN AIR FLOW

FIELD OF THE INVENTION

This invention relates to a mechanism for linearizing an unconfined upward flow generated by rotation of a propeller about a vertical axis, and more particularly to a simple structure mountable above a free-standing rotating propeller to provide a linearized high-speed air flow of substantial cross-section in a manner particularly suitable for enabling the simulation of free-fall conditions.

BACKGROUND OF THE PRIOR ART

The sport of "free-falling" wherein a suitably-dressed participant jumps out of an aircraft and falls for a time in "free-fall" before opening a parachute is becoming increasing popular in the United States and in other countries. Recent reports indicate, surprisingly, that China has the largest number of free-fall enthusiasts of any country in the world. Quite apart from the sports aspects of such activity, the air forces of every militarily significant country require their paratroops and special forces to be trained in free-fall techniques.

It is obviously very expensive, and can be fatally dangerous, simply to take an untrained person and let them learn free-fall techniques only while dropping from an aircraft toward the ground. Therefore, there has long been a perceived need for a system providing an adequate cross-section of essentially uniform, i.e., linearized, air flow at a speed between 90 mph. to 150 mph. very close to the ground. With such a system, one or more trainees can be artificially maintained in simulated "free-fall" conditions at a safe height and in a manner which permits training staff to communicate with and correct trainee errors in real time.

Among the known systems is one taught in U.S. Pat. No. 5,209,702, titled "FREEFALL SIMULATOR", to Arenas, issued on May 11, 1993. It teaches a freefall simulator system housed in a building specifically designed for this purpose, and employs a hydraulic drive train consisting of two separate hydraulic motors, one to provide from 0% to 50% of the power needs of the simulator and the other to provide the remaining 51% to 100% of such power needs on a controlled increase, on demand, to drive a propeller to generate an upward air flow corresponding to the specific size, shape and weight of a person practicing simulated freefall. The building containing the system is deliberately designed for noise abatement, with an "earth berm" surrounding it to redirect any noise escaping the building in an upward direction. The system uses "S" shaped baffles mounted over large individual baffles disposed above a propeller rotated by the combined output of the two separate hydraulic motors.

The above-described system, like other earlier-developed known systems, requires an entire building, needs expensive and relatively complex drive systems, and has other related limitations.

After considerable research and development effort, it was determined that it is possible at reasonable power levels to generate a large, high-speed, linearized upward flow in an entirely open system to greatly facilitate simulated free-fall experiences by one or more participants, while allowing one or more trainers literally to stand within arms reach of the participants/trainees actually doing the simulated free-falling. The present invention is based on this theoretical and empirical development, and provides a sturdy system that can be erected and disassembled relatively quickly and economically, making it possible for a user, such as a military service, to provide training at short notice and to provide training in out-of-the-way places very conveniently. The invention also lends itself to forms suitable for general public participation, e.g., at fair grounds and the like.

The invention, as described below and as illustrated in the accompanying drawing figures, employs a very simple and rugged structure to efficiently linearize a substantial upward air flow, especially over the propeller axis, while simultaneously enabling both participants and trainers to safely walk at a suitable height above the air-flow generating propeller

SUMMARY OF THE INVENTION

Accordingly, it is a principal object of this invention to provide a mechanism for vertically linearizing an unconfined air flow generated by a free-standing, multi-bladed propeller rotated about a vertical axis.

It is another object of this invention to provide a free-fall simulation system with more than one element for progressively linearizing a vertical flow generated by a rotating propeller, to thereby provide a uniform linearized air flow of substantial cross-section in an open environment.

It is yet another object of this invention to provide a method of linearizing a vertically upward unconfined flow of air generated by a propeller rotated about a vertical axis.

In a preferred embodiment, these and other related objects are realized by providing a mechanism which includes an open first cylindrical element disposed coaxially with and above a central portion of the flow-generating rotating propeller, and a plurality of vertically planar evenly separated first guide vanes. These guide vanes are disposed radially of the vertical axis about which the propeller rotates, and are each connected at respective radial inside ends to the cylindrical element and are supported at respective outside ends with their lower edges located in a plane at a selected height above a trailing edge of a blade of the propeller.

In another aspect of the invention there is provided a free-fall simulation system to produce a linearized unconfined air flow generated by a free-standing multi-bladed propeller rotated about a vertical axis, a horizontal frame supported above the multi-bladed propeller. A plurality of supports hold a first flow-linearizing means comprising an open first cylindrical element disposed coaxially with and above a central portion of the propeller, with a plurality of vertically planar, evenly separated and radially oriented guide vanes, with their respective radial inside ends connected to the cylindrical element and their corresponding radially outside ends supported so that lower edges of the guide vanes are disposed in a first plane at a selected height above trailing edges of the propeller blades.

For improved linearization, in another embodiment the system also includes a second flow linearizing element which comprises a screen formed of a plurality of spaced apart and individually tensioned first cables each oriented parallel to a first direction, and a plurality of spaced apart and individually tensioned second cables each oriented parallel to a second direction perpendicular to the first direction, with the first and second cables mutually woven to each other in an over and under manner but entirely free of extraneous constraints relative to the intersecting cables. This screen is highly air-permeable, is located above the guide vanes, provides supplementary linearization of the upwardly directed air flow, and simultaneously serves to provide an easily repaired yet very strong and durable support for participants and/or trainers as needed.

In yet another aspect of this invention, there is provided a method of vertically linearizing an unconfined air flow generated by a free-standing multi-bladed propeller rotated about a vertical axis, comprising the steps of disposing an open first cylindrical element coaxially with and above a central portion of the propeller. A plurality of vertically planar, evenly separated, first guide vanes is disposed radially of the vertical axis, the first guide vanes each being connected at a radially inside end to the cylindrical element and supported at a radially outside end so that their respective elongate lower edges are located in a first plane at a first height above a trailing edge of the propeller blades.

These and other aspects of the present invention will be better understood, with reference to the accompanying drawing figures, from the more detailed description provided below.

BRIEF DESCRIPTION OF DRAWING

FIG. 5 is a plan view of an air-permeable support screen structure which provides additional flow-linearization as well as support for persons practicing or providing training in free-fall exercises;

FIG. 6 is a schematic view to illustrate alternative geometries for the principal flow-linearizing mechanism according to the present invention; and FIG. 7 is a partial perspective view to explain how, in the preferred embodiment, two sets of cooperating but differently sized guide vanes are supported to each other to linearize a vertical air flow therethrough.

DETAILED DESCRIPTION OF THE PREFERRED EMBODIMENTS

Figure 1:
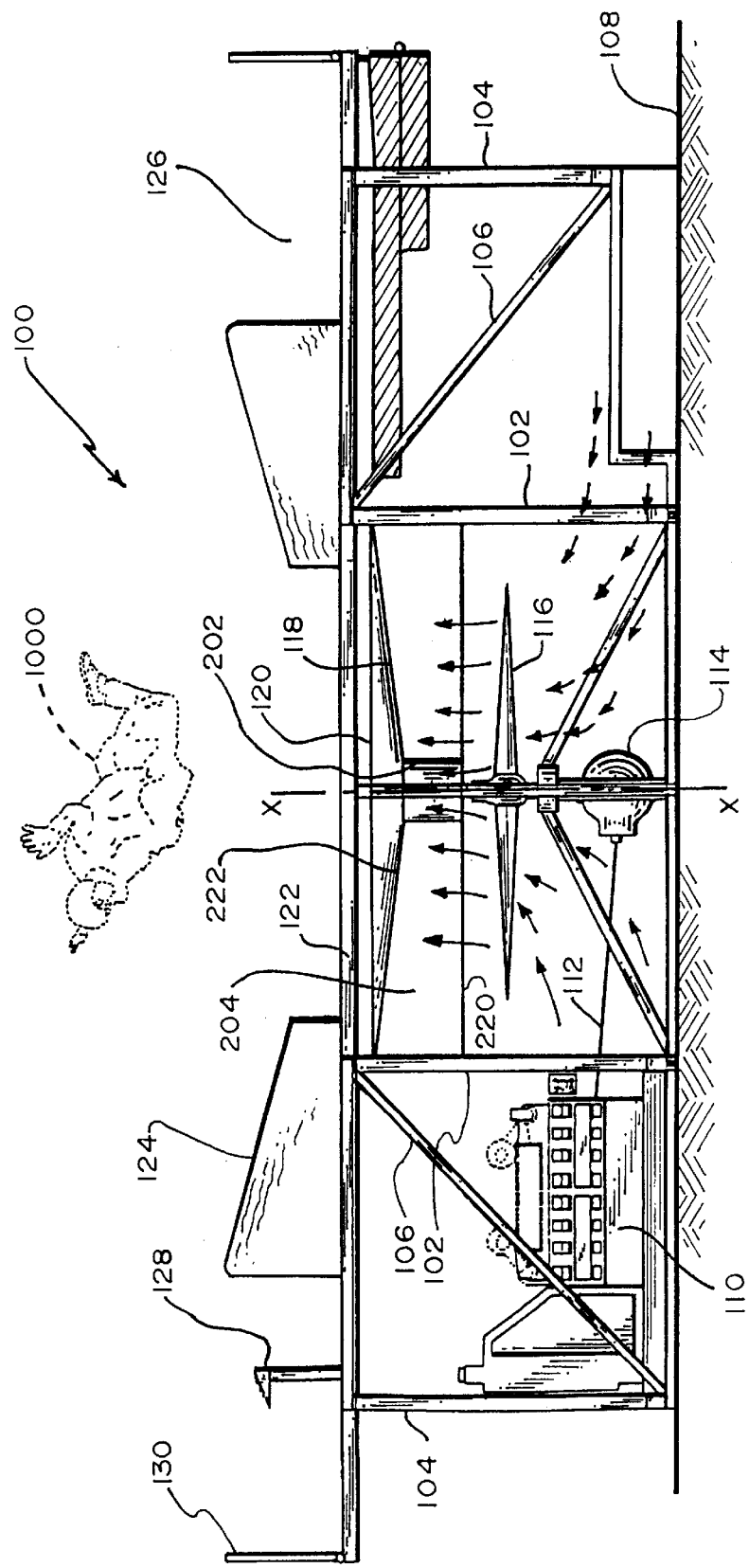
FIG. 1 is a vertical cross-sectional view of a static system for generating a controlled, smooth, high-speed flow of air to permit simulated free-fall exercises, the flow being directed vertically upward through a flow-linearizing mechanism according to a preferred embodiment of this invention.

FIG. 1 illustrates in schematic form, in vertical cross-sectional view, a static system for enabling simulated free-fall exercises. Such a system is generally known in the relevant art as an "airodium". As illustrated, during operation the airodium 100 provides a very close approximation to a relatively upward flow of air fast enough to continually support a suitably dressed person 1000 entirely out in the open, i.e., outside the confines of a building, wind tunnel, or the like.

Airodium structure 100 has the form of a strong but readily erectable frame comprising a plurality of upward support elements 102 and 104, and bracing elements 106, which together support an extended horizontal structure at a selected height above ground 108. The system includes an internal combustion engine 110, as indicated in FIG. 1, or a comparably powerful electric motor (not shown) to provide rotational drive to a drive shaft 112 connected to a gear box and transmission 114 to rotate a vertical shaft to which is mounted a rotating propeller 116. This may be a conventional type of propeller, preferably one with pitch control.

Rotation of propeller 116 about its vertical axis X—X causes a forced, high-speed, upward flow of air (as indicated by the short arrows) which flows from the surroundings to a region below the propeller and is then driven upward by the propeller blades past a flow-linearizing structure 118 mounted to upward support elements 102, 102. Note that ambient air is drawn radially inward to blend in with and be driven upward by that air which is propelled upward by passage through the propeller blades themselves.

Immediately above the flow-linearizing structure 118 may be provided a safety screen 120 formed of intersecting and interconnected steel rods, typically spaced about 9 in. apart to ensure against inadvertent and harmful access by the legs of person 1000 to rotating propeller 116 in the event of catastrophic structural failures.

Just above safety screen 120 is provided an air-permeable support net structure 122 which provides support for person 1000 before he or she is lifted by the upward air flow. It also provides support for one or more training personnel standing at the periphery of the upward flow and communicating in "real time" with the person 1000 supported by the air flow. In addition to its person-supporting function, the air-permeable screen, as disclosed fully in my copending and contemporaneously filed U.S. patent application Ser. No. 08/240,518, titled "AN AIR-PERMEABLE SUPPORT SCREEN", provides air-linearizing benefits by interaction between the screen cables and the air flow that leaves the flow linearizing vane structure 118 therebelow. This reference is expressly incorporated herein by reference for its teaching of the screen structure and benefits provided thereby. Details of the structure and functionality of both air-linearizing structure 118 and air-permeable support screen structure 122 are provided below with reference to other figures as appropriate.

Figure 3:
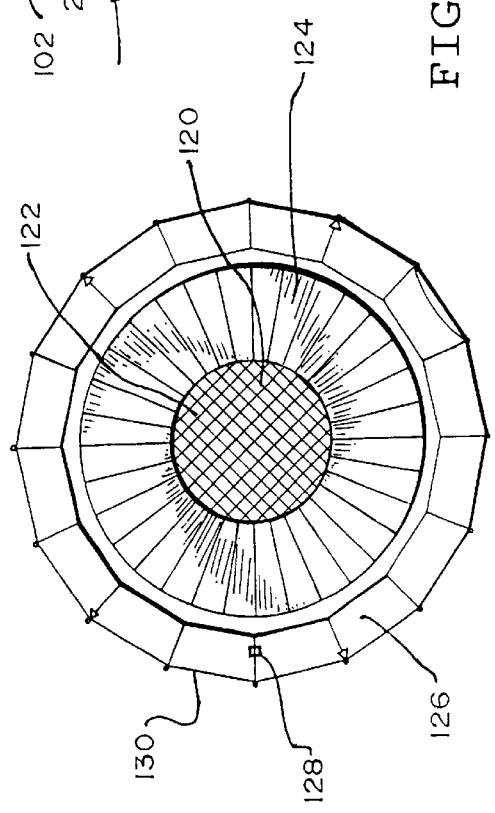
FIG. 3 is a plan view of a free-fall simulation system incorporating the preferred embodiment.

As best seen with combined reference to the cross-sectional view per FIG. 1 and the plan view per FIG. 3, a cooperating set of resilient wedge-form cushions 124 is provided, overlapping the extreme peripheral portions of air-permeable screen support structure 122 so as to completely surround the air flow region. These cushions 124 may be covered with a strong and easily cleaned material, e.g., a vinyl-covered cloth. Acting together, the cushions provide a mildly inward-sloping annular cushioning surface to protect the free-fall practitioner 1000 in the event that he or she should slip out of the upward air flow and, losing its upward support, fall. Under normal operation, before and after provision of the desired air flow, person 1000 would cross the cushions 124 and walk or stand on the intersecting cables of the screen structure 122 and then advance radially inward until the upward air flow provides sufficient momentum to lift him or her in simulated free-fall.

Surrounding the annular assembly of cushions 124 is a region 126 which may be in the form of a plywood or metal platform upon which observers and/or trainers may be positioned as appropriate. The system may be operated from an operating console 128 and have a peripheral safety fence 130 at its outermost periphery.

The focus of the present invention is on those elements of the structure which serve to reduce swirl components, i.e., tangential components of velocity relative to the propeller axis and incidental turbulence, which are inevitably imparted to the incoming air flow by the rotating propeller blades driving the air flow vertically upwards.

The term "linearized" as applied to the vertical air flow herein is intended to mean not a perfectly laminar and unidirectional air flow but one which, in the totally open environment surrounding the unconfined air flow, has highly reduced swirl components and a substantially uniform upward velocity profile across a substantial cross-section of the upward flow for a useful height above the air-permeable support screen structure 122. In other words, the present invention is not intended to generate a perfectly laminar and totally uniform flow but, rather, is intended to eliminate the well known uneven velocity distribution in the central region surrounding axis X—X over the propeller hub and to reduce swirl components to a minimum so that the person experiencing simulated free-fall enjoys a very close approximation to terminal velocity conditions. As noted earlier, the overall goal is to permit the person 1000, while in training, to also communicate in "real time" with one or more trainers located nearby so that corrective instructions and training are received under closely replicated free-fall conditions.

Figure 2:
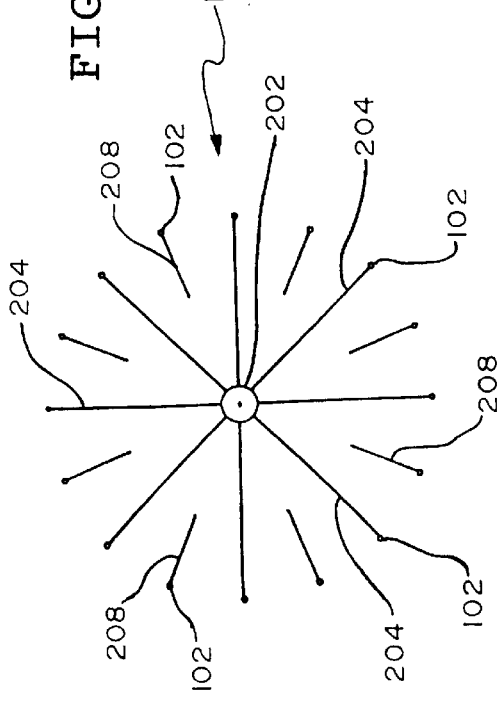
FIG. 2 is a plan view of principal elements of the flow-linearizing mechanism according to the preferred embodiment.

FIG. 2 is a plan view of a preferred embodiment of the principal elements of flow-linearizing vane structure 118. Prior art designs have mounted bullet-shaped central elements above the propeller in an effort to smooth the air-flow. Other solutions, e.g., per Arenas, supra, require the mounting of S-shaped or similar vanes, etc., to deal with uneven velocity distributions in the flow produced by such bullet-shaped central elements. The results obtained from employing such systems are considered to be less than satisfactory, and the present invention is intended to provide significantly better flow linearization in simple manner.

Flow-linearizing structure 118, as best seen in FIG. 2, includes a central cylindrical element 202 mounted coaxially above the center of rotating propeller 116. The lower circumferential edge of cylindrical element 202 is located at a height $h_v$ relative to the extreme trailing edge tips of blades of propeller 116. See FIG. 4.

The flow-linearizing structure 118 also includes a plurality of vertically planar guide vane elements 204 which are connected at their radially inward ends to the outer surface of cylindrical element 202, e.g., by welding, riveting, nuts and bolts, or in any other conventional manner. At their respective radially outward ends guide vane elements 204 are individually supported at the upper ends of supports 102, 102 in cantilevered fashion. However, because of the interconnection between diametrically opposite vanes 204, 204 through their mutual connection to cylindrical element 202, each pair of diametrically opposite vanes forms a bridge-like structure. The consequence of having a number of such radial vanes 204, of which eight are illustrated in FIG. 2, is that the entire flow-linearizing structure 118 is quite rigid and strong, and thus capable of countering the tangential momentum imparted to air driven upwardly by the rotation of propeller 116.

Upward supports 102 may be formed of hollow pipes, solid cylinders, I-beams, or other elongate elements. The key is that they should have the requisite physical strength yet present minimal impedance to radially inward flow of air from the surroundings toward axis X—X of propeller 116 during use of the system.

Guide vanes 204 may be made of any suitable material, e.g., mild steel sheet, strong plywood, or the like. The use of steel permits relatively thin sheets to be formed and used in this manner, and experimentation has shown that no particular rounding of any edges is then necessary. However, if these vanes 204 are made of plywood, preferably 2½ in. thick, it is essential to round off at least the lower horizontal edges 206, 206.

If the cross-section of the desired air flow is large, so that the circumferential separation between the radially outside ends of vanes 204 becomes significant, it has been found essential to provide, in addition, a supplementary set of radially-oriented shorter secondary flow-linearizing vanes 208, 208. Vanes 208 have a shorter radially directed length, and are supported in cantilevered manner on their own respective upright supports 102.

The lowermost edges of all of the vanes, both 204 and 208 (if provided) are disposed to be in a common horizontal plane located $h_v$ above the trailing tip edges of the blades of propeller 116.

FIG. 5 shows an exemplary support screen structure 122, namely one which provides a twelve-sided support screen. This includes a peripheral support member 502 which may be made of any convenient material, e.g., metal tubing, L-section, I-section, or other type of metal beam, or even strong wooden elements. The important thing is that the outer form and strength of peripheral support member 502, when mounted to the top of supports 102, 102 above safety screen 120, must comfortably withstand the weight of one or more individuals standing thereon and any transient forces imposed by the flow of upwardly directed air through opening in the screen itself.

The screen 504 is actually formed of a first set of parallel cables 506 which are oriented in a first direction, e.g., vertical as shown in FIG. 5, and interwoven therewith in an up-and-down manner over successive cables 506 a second set of parallel cables 508 which are all oriented orthogonal to cables 506. Traditionally, support screen structures have included either knots between intersecting cables at the intersections or, particularly when the cables were made of a metal, swages providing external connection at each intersection. Such knots or swages pose a flow impedance to the upwardly directed flow, hence it is highly desirable to eliminate them entirely. This has not been possible in previously known screen structures in which the peripheral support element of the screen was flexible and was itself supported to external supports. Instead, as more fully described and separately claimed in my copending above-referenced application, expressly incorporated herein for its teaching of the details of the screen structure, a superior screen is produced by individually tensioning each of the cables separately to peripheral support member 502. This is best accomplished by forming loops at the distal ends of each cable and, by hooking or otherwise, attaching elastic tensile members connected to peripheral support member 502. By suitable selection of such elastic members, e.g., elongate helical springs, flexible rubber elements, etc., and by providing conventional tensioning adjustment such as threaded eye-bolts, the support screen structure 122 can very easily be formed so that each cable is equally and individually tensioned. As more fully explained in my referenced copending application, this permits easy replacement of individual cables if and when they fail, and allows each of the cables to flex at intersections without experiencing undue stress. Furthermore, the absence of extraneous constraints at the intersections, e.g., knots or swages, greatly facilitates air flow through the screen structure.

The above-described screen structure performs yet another highly beneficial task, namely that of further evening out or linearizing the upward flow which has been primarily linearized by its passage through guide vane structure 118. Thus, the described support net structure 122 works cooperatively with and enhances the linearization of air flow provided by guide vane structure 118 in the present invention.

It will be seen from FIG. 1 that one geometric form for guide vanes 204 is trapezoidal, with the lowest edge 220 horizontal and located in a first horizontal plane immediately above the propeller blades, and an inclined upper edge 222 which ends at the top of cylindrical element 202. This is only one of a number of alternative geometries suitable for the vane structure.

Figure 4:
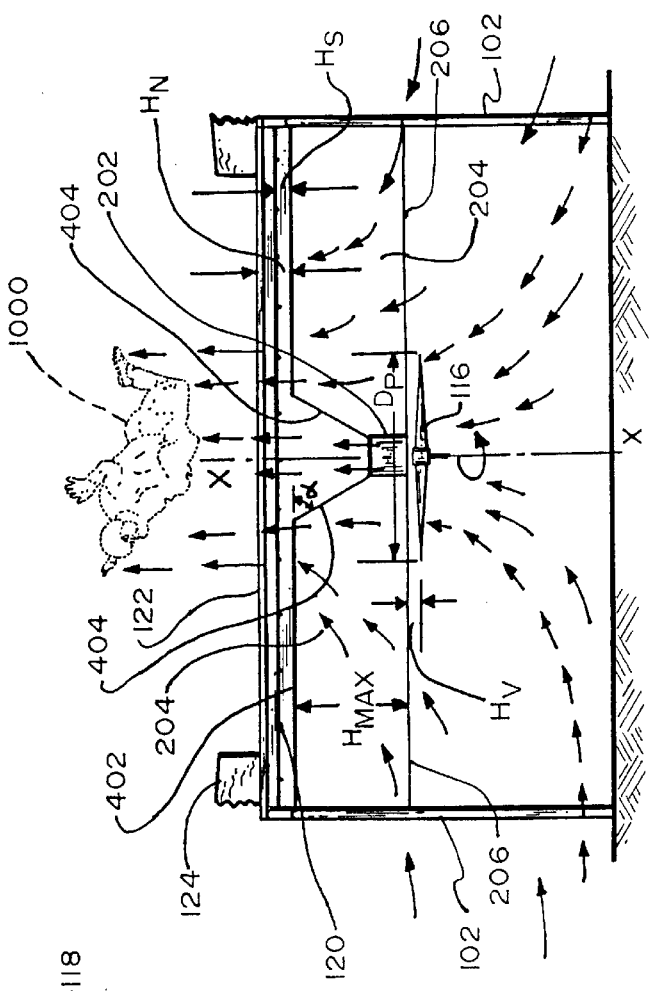
FIG. 4 is a partial vertical cross-sectional view according to a second embodiment of a flow-linearizing mechanism, to explain the interaction thereof with other principal elements for further linearizing the air flow in an open environment.

As best seen in FIG. 4, in another alternative, a substantial portion of the larger guide vanes 204 has a rectangular shape, i.e., the horizontal lower edges are in a first plane above propeller 116 and the upper edges 402 are also horizontal and are all located in a second plane, thus defining a region of uniform height $h_{max}$. A gap of $h_s$ may be identified between the upper edges 402 of guide vanes 204 and safety screen 120 located thereabove. Similarly, a gap $h_n$ can be readily identified in FIG. 4 between upper edges 402 of guide vanes 204 and the intersecting screen cables of screen structure 122. In the vane structure illustrated in FIG. 4, the cylindrical element 202 has a height less than $h_{max}$ and the radially inside end portions of vanes 204 are formed with inclined sides 404, 404 which form an angle α with the second plane in which upper horizontal edges 402 lie. This angle α preferably ranges from 40° to 60° but may be provided other values as desired.

FIG. 6, in simplified schematic form, shows other alternatives, identified as I–IV, for the guide vane structure geometries. Thus, the central cylinder may be reduced to one or two cylindrical "rings" of relatively short height in the axial direction (II), guide vanes 204 may be rectangular (II and III) or partially rectangular and partially trapezoidal (I and IV), and the cylindrical portion and/or ring portion (IV) may be located to end at the lower edges of the vanes, the upper edges of the vanes (I, II, III), or with one ring ending at each of the first and second planes (III) corresponding to the lower and upper horizontal edges of the guide vanes 204. Obvious modifications of such geometric aspects will readily occur to persons of ordinary skill in the art and are intended to be comprehended within the spirit and scope of the present invention as claimed.

Note that the numeral "204" is employed generally throughout this description to refer to those guide vanes which extend to and are connected to the central cylindrical or ring-like element 202, regardless of the above-discussed geometric and shape differences at the radially inside end portions of these guide vanes. When additional shorter supplementary guide vanes 208, as best seen in FIG. 2, are utilized, these shorter vanes are preferably made in a form which matches the radially corresponding portions of the longer guide vanes 204.

As will be appreciated, the shorter guide vanes 208, being supported only in cantilevered manner, may tend to suffer vibrations generated by the swirl or tangential components of the air flow being guided thereby. To stiffen and strengthen the overall guide vane structure, it is preferable to cross-brace guide vanes 204 to adjacent guide vanes 208, and vice versa. As illustrated in FIG. 7, such bracing may take the form of intersecting rigid elements 702, 702 connected at opposite ends to one each of guide vanes 204 and 208. The intersections of such bracing elements 702, 702 may also be connected by any conventional means, e.g., riveting, nuts and bolts, welding, or the like, if the bracing elements 702 are made of a metal. The use of relatively slim bracing elements 702, 702 interposes a relatively small flow impedance to radially and inwardly directed flow from the surroundings toward axis X—X about which propeller 116 rotates and about which the cylindrical element 202 is positioned.

The cylindrical shape of element 202, in all of the different variations and embodiments of the vane structure as described above, is critical. As mentioned above, in all known earlier designs it was common to use a rounded bullet-shaped central element directly above the hub of the rotating propeller. It was believed then that the upwardly directed air flow would smoothly go over such a surface and would unite at the axis above the bullet-like central element of the linearizing vane structure. In practice, however, it was found that this did not happen and that at free-fall air speeds the central portion of the flow did not unite at all and created a central column of stagnant air within the upwardly moving air column, which made it uncomfortable very difficult for the person seeking to experience simulated free-fall. It is found that the provision of a central, relatively thin-walled, cylindrical central element 202 is highly beneficial in guiding upwardly the propeller-generated air flow in such a manner that there is a singularly uniform velocity distribution across the upwardly flowing air column. The presence of the cylindrical element 202 causes the flowing air to come together centrally above the propeller hub but before it reaches the level of the bottom edges of the guide vanes 204. Such a disposition of the cylindrical element 202, without any additional elements such as S-shaped or other vanes, produces the desired evening of the flow about the axis X—X.

Experimentation has also shown that shortening the axial length of cylindrical element 202 does not deteriorate its low-linearizing performance. Such experiments establish that having an axial length of the cyclindrical elements in the range 10%–50% of the uniform vane height (when the vanes are rectangular) provides adequate linearization of the air flow from the propeller. This is true even for guide vane forms and combinations of two sets of plane vanes not all of which have an entirely rectangular form, and also when two cylindrical elements are used per any of the forms I–IV illustrated in FIG. 6.

In one preferred embodiment with a single cylindrical element 202, a preferred height for it is in the range 30% to 60% of the maximum vane height. For the vane forms I and IV per FIG. 6, the guide vanes may therefore be formed with an inside straight edge inclined from an upper end of the cylindrical element 202 at an angle between 40° and 60° relative to plane in which the upper horizontal edges of the vanes lie. Therefore, depending on the desired final upward velocity of the linearized flow, the available power to drive the propeller, the nature and size of the propeller, etc., any of the above-described variations of low-linearizing structure geometries may be employed as best suited to particular needs.

Propellers mounted as illustrated in FIG. 1 are generally referred to as "free-standing" propellers. Drive shaft 112 is made long enough to allow ample room around the propeller 116 for air to flow in freely towards axis X—X.

For realistic simulation of free-fall, linearized air flow speeds of 140 mph., with an air column diameter of about 15 ft. is considered desirable.

Net cables 506 and 508, as described in relation to the screen structure 122 illustrated in FIG. 5, are preferably 3/32 in. in diameter and are spaced apart to leave 2 in. gaps between adjacent cables, thus providing 2 in. square openings for the air flow.

The safety screen 120, as best in FIGS. 1 and 4, is preferably made of ½ in. diameter steel rods approximately 9 in. apart to provide square openings.

In prototype experiments, using diesel engines producing between 900 and 2500 h.p., with engine output at 1000 to 2100 r.p.m., to drive a propeller of between 5.75 ft. to 8 ft.

radius, an air column between 11 ft. and 16 ft. diameter can be produced in linearized form to extend up to 50 ft. above the support screen structure 122. Obviously, by controlling the speed of rotation of the propeller, which can be done easily by controlling either the engine output speed and/or the gearing in transmission 114, it is possible to maintain a person 1000 in simulated free-fall at a height such that training personnel standing nearby can, in real time, communicate instructions. This is particularly important because in free-fall training where a person actually drops from an aircraft, an observer falling alongside can only video tape the performance of the trainee and discuss it with him or her only after the exercise is over. The highly linearlized flow made possible by the structure disclosed herein thus greatly simplifies the job of training people in simulated free-fall by facilitating better and more immediate instruction. Likewise, for non-military applications, e.g., at fairgrounds and the like where average citizens may be provided goggles and safety dress, even relatively untrained individuals can safely enjoy the free-fall experience.

In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

What I claim is:

1. A mechanism for vertically linearizing an unconfined upward air flow generated by a free-standing multi-bladed propeller rotated about a vertical axis when disposed above the rotating propeller, comprising:

an open first cylindrical element adapted to be disposed coaxially with and above a central portion of the propeller; and a plurality of vertically planar, evenly separated, first guide vanes disposed radially of said vertical axis, said first guide vanes each being connected at a radially inside end to said cylindrical element and supported at a radially outside end so that respective elongate lower edges of the first guide vanes are adapted to be located in a first plane at a first height above a trailing edge of a blade of the propeller, so that the first guide vanes and the first cylindrical element cooperate to substantially linearize the upward airflow by themselves.

2. The mechanism according to claim 1, wherein:

each of said first vanes is rectangular in shape and has a uniform vane height extending from a corresponding lower edge located in said first plane to an upper edge parallel thereto and located in a second plane thereabove.

3. The mechanism according to claim 2, wherein:

said first cylindrical element has an upper end located at said second plane and an axial length less than said uniform vane height.

4. The mechanism according to claim 3, wherein:

said axial length of said first cylindrical element is between 10% and 50% of said uniform vane height.

5. The mechanism according to claim 1, wherein:

said first cylindrical element has a lower end located at said first plane; and each of said first guide vanes has a straight upper edge extending upwardly from an upper end of said first cylindrical element to a maximum vane height at said radially outside end.

6. The mechanism according to claim 5, wherein:

said first cylindrical element has an axial length which is between 30% and 60% of said maximum vane height.

7. The mechanism according to claim 1, wherein:

each of said first guide vanes has a uniform height for a first portion of its length inwardly of said radially outside end and an upper elongate edge located in a second plane parallel to and above said first plane;

said first cylindrical element has an upper end located at said second plane and an axial length less than said uniform height; and each of said first guide vanes has an inside straight edge inclined from a lower end of the first cylindrical element at an angle between 40% and 60% relative to said first plane.

8. The mechanism according to claim 1, wherein:

each of said first guide vanes has a uniform height for a first portion of its length inwardly of said radially outside end and an upper edge located in a second plane parallel to and above said first plane;

said first cylindrical element has a lower end located at said first plane and an axial length less than said uniform height; and each of said first guide vanes has an inside straight edge inclined from an upper end of the first cylindrical element at an angle between 40° and 60° relative to said second plane.

9. The mechanism according to claim 1, wherein:

a number of said first guide vanes is selected to be such that a leading edge of only one blade of said multi-bladed rotating propeller passes directly under one of said first guide vanes at any time during rotation of said propeller.

10. A mechanism for vertically linearizing an unconfined air flow generated by a free-standing multi-bladed propeller rotated about a vertical axis, comprising:

an open first cylindrical element adapted to be disposed coaxially with and above a central portion of the propeller;

a plurality of vertically planar, evenly separated, first guide vanes disposed radially of said vertical axis, said first guide vanes each being connected at a radially inside end to said cylindrical element and supported at a radially outside end so that respective elongate lower edges of the first guide vanes are adapted to be located in a first plane at a first height above a trailing edge of a blade of the propeller; and an open second cylindrical element disposed coaxially with said first cylindrical element and connected to the radially inside ends of said first guide vanes, wherein said first cylindrical element has an upper end located at said second plane and an axial length less than said uniform vane height, and wherein said second cylindrical element has a lower end located at said first plane and an axial length less than said uniform vane height so that there is an axial gap between said lower end of said first cylindrical element and an upper end of said second cylindrical element.

11. The mechanism according to claim 10, wherein:

at least one of said first and second cylindrical elements has an axial length between 10% and 50% of said uniform vane height.

12. A mechanism for vertically linearizing an unconfined air flow generated by a free-standing multi-bladed propeller rotated about a vertical axis, comprising:

an open first cylindrical element adapted to be disposed coaxially with and above a central portion of the propeller;

a plurality of vertically planar, evenly separated, first guide vanes disposed radially of said vertical axis, said first guide vanes each being connected at a radially inside end to said cylindrical element and supported at a radially outside end so that respective elongate lower edges of the first guide vanes are adapted to be located in a first plane at a first height above a trailing edge of a blade of the propeller; and a plurality of vertically planar second guide vanes disposed radially of said axis in even alternation with said first guide vanes, said second guide vanes each being supported at a radially outside end so that respective elongate lower edges of the second guide vanes are located in said first plane, said second guide vanes being formed to be shorter in a radially oriented length than said first guide vanes.

13. The mechanism according to claim 12, further comprising:

means for bracing said second guide vanes to adjacent first guide vanes.

14. A free-fall simulation system providing vertically linearized unconfined air flow generated by a free-standing multi-bladed propeller rotated about a vertical axis, comprising:

a first flow linearizing means comprising an open first cylindrical element disposed coaxially with and above a central portion of the propeller, and a plurality of vertically planar evenly separated first guide vanes disposed radially of said vertical axis, with each of said first guide vanes connected at a radially inside end to said cylindrical element and supported at a radially outside end so that respective elongate lower edges of the first guide vanes are located in a first plane at a first height above a trailing edge of a blade of said propeller; and a second flow linearizing means mounted above the first flow linearizing means, comprising an air-permeable support net formed of a plurality of spaced apart and individually tensioned first cables each oriented parallel to a first direction and a plurality of spaced apart and individually tensioned second cables each oriented parallel to a second direction perpendicular to said first direction, with each of said second cables woven in an over and under manner free of extraneous constraints relative to successive intersecting first cables and vice versa.

15. The system according to claim 14, further comprising:

a plurality of tensioning means for applying respective tension forces to each of said first and second cables to individually tension the same.

16. The system according to claim 14, further comprising:

a plurality of vertically planar second guide vanes disposed radially of said axis in even alternation with said first guide vanes, said second guide vanes each being supported at a radially outside end so that respective elongate lower edges of the second guide vanes are located in said first plane, said second guide vanes being formed to be shorter in a radially oriented length than said first guide vanes.

17. The system according to claim 13, wherein:

a number of said first guide vanes is selected to be such that a leading edge of only one blade of said multi-bladed rotating propeller passes directly under one of said first guide vanes at any time during rotation of said propeller.

18. A method of vertically linearizing an unconfined air flow generated by a free-standing multi-bladed propeller rotated about a vertical axis, comprising the steps of:

disposing an open first cylindrical element coaxially with and above a central portion of the propeller; and providing a plurality of vertically planar, evenly separated, first guide vanes disposed radially of said vertical axis, said first guide vanes each being connected at a radially inside end to said cylindrical element and supported at a radially outside end so that respective elongate lower edges of the first guide vanes are located in a first plane at a first height above a trailing edge of a blade of the propeller, so that the unconfined air flow generated by the propeller is intercepted by the first guide vanes and the first cylindrical element, whereby the unconfined air flow generated by the propeller flows upward and is substantially linearized solely by said first and second guide vanes and said first cylindrical element cooperating therewith.

19. The method according to claim 18, comprising the further step of:

disposing a plurality of vertically planar second guide vanes radially of said axis in even alternation with said first guide vanes, said second guide vanes each being supported at a radially outside end so that respective elongate lower edges of the second guide vanes are located in said first plane, said second guide vanes being formed to be shorter in a radially oriented length than said first guide vanes, so that the unconfined air flow generated by the propeller is intercepted by the first guide vanes and the first cylindrical element, whereby the unconfined air flow generated by the propeller flows upward and is substantially linearized solely by said first and second guide vanes and said first cylindrical element cooperating therewith.

20. A method of vertically linearizing an unconfined air flow generated by a free-standing multi-bladed propeller rotated about a vertical axis in a free-fall simulation system, comprising the steps of:

directing air-flow from said propeller through a first flow linearizing means mounted above the propeller, said linearizing means comprising an open first cylindrical element disposed coaxially with and above a central portion of the propeller and a plurality of vertically planar evenly separated first guide vanes disposed radially of said vertical axis, with each of said first guide vanes connected at a radially inside end to said cylindrical element and supported at a radially outside end so that respective elongate lower edges of the first guide vanes are located in a first plane at a first height above a trailing edge of a blade of said propeller; and further directing air-flow that has passed through the first flow linearizing means through a second flow linearizing means comprising an air-permeable support net formed of a plurality of spaced apart and individually tensioned first cables each oriented parallel to a first direction and a plurality of spaced apart and individually tensioned second cables each oriented parallel to a second direction perpendicular to said first direction, with each of said second cables woven in an over and under manner free of extraneous constraints relative to successive intersecting first cables and vice versa, to thereby obtain a vertically linearized unconfined air flow.

* * * * *